March 8, 1949. R. N. PALMER 2,463,799
BUTTON BLANK CUTTING MACHINE
Filed Oct. 17, 1945 3 Sheets-Sheet 1
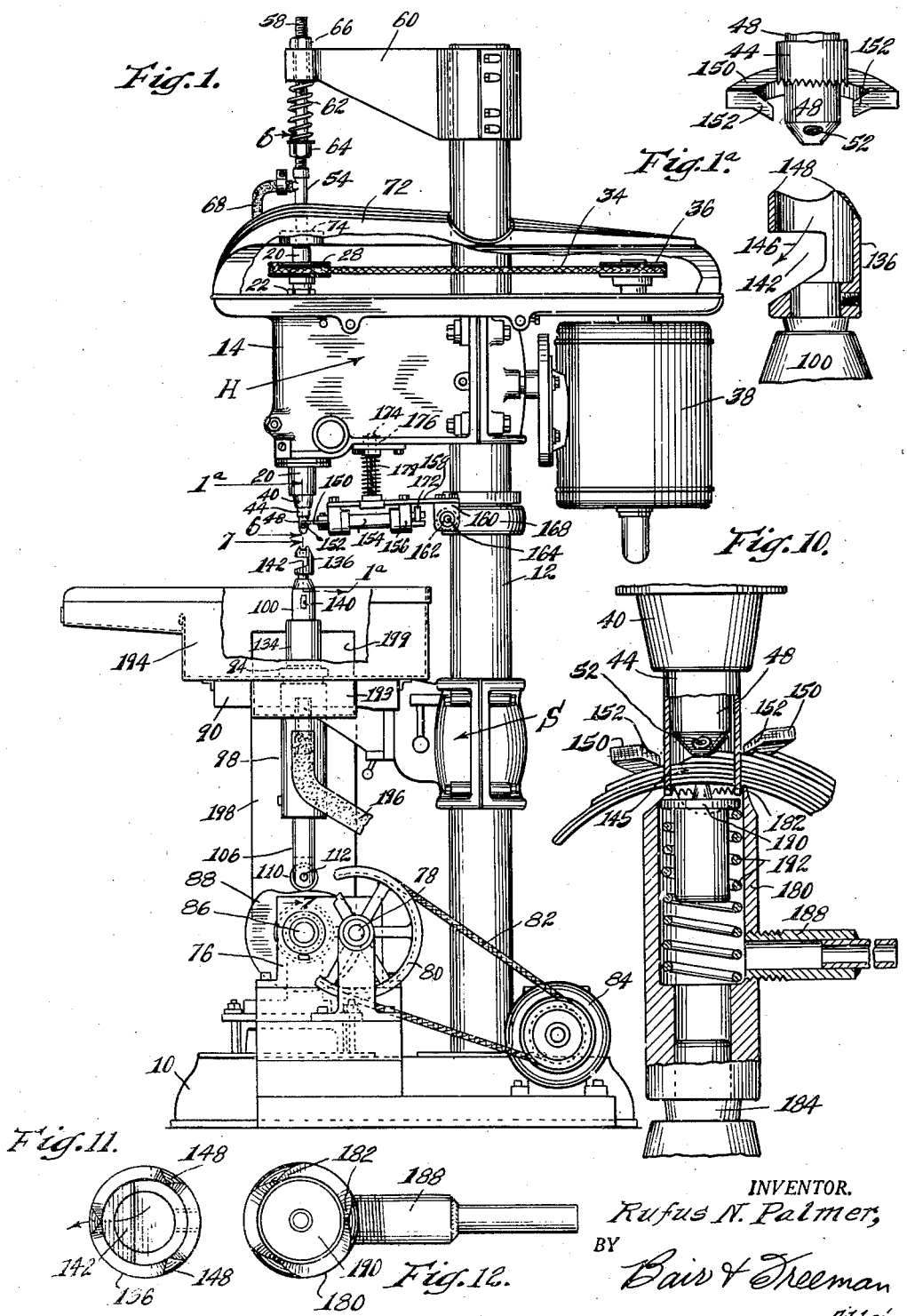
INVENTOR.
Rufus N. Palmer,
BY
Bair & Freeman
Attys.

March 8, 1949.  R. N. PALMER  2,463,799
BUTTON BLANK CUTTING MACHINE
Filed Oct. 17, 1945  3 Sheets-Sheet 2
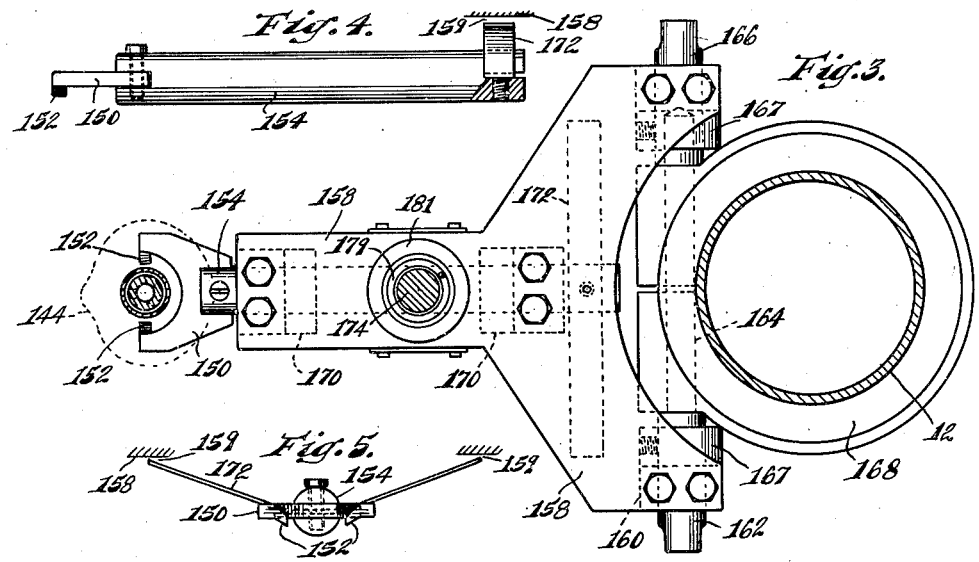
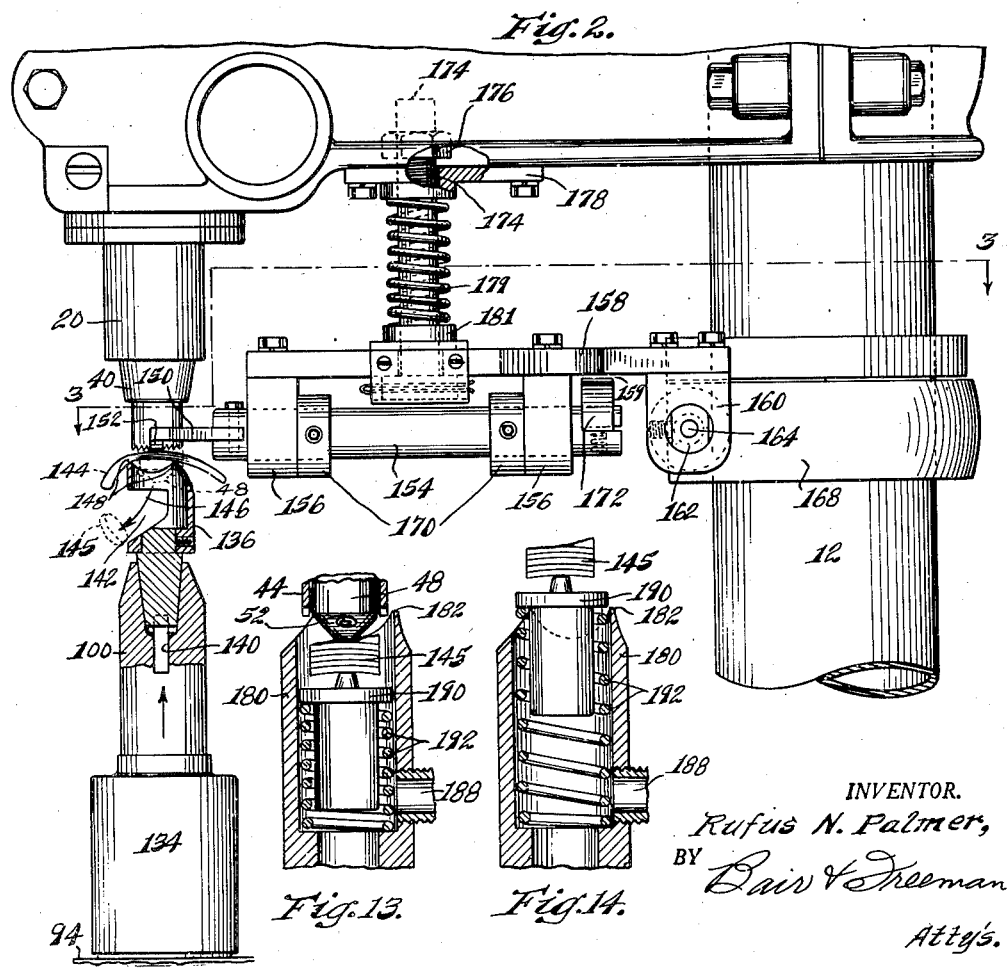
INVENTOR.
Rufus N. Palmer,
BY Bair & Freeman
Attys.

March 8, 1949.    R. N. PALMER    2,463,799
BUTTON BLANK CUTTING MACHINE
Filed Oct. 17, 1945    3 Sheets-Sheet 3
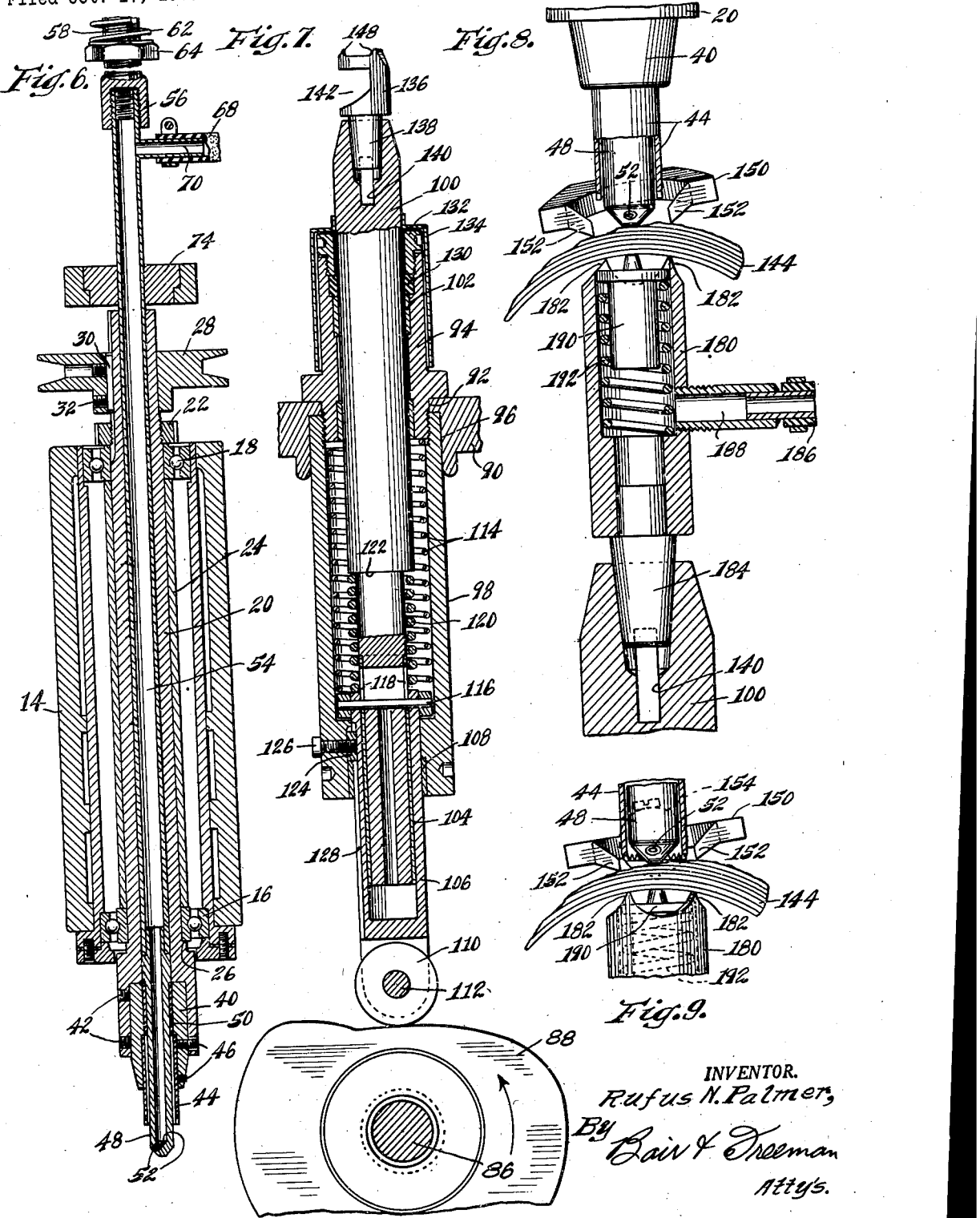
INVENTOR.
Rufus N. Palmer,
By Bair & Freeman
Atty's.

Patented Mar. 8, 1949

2,463,799

UNITED STATES PATENT OFFICE 2,463,799

BUTTON BLANK CUTTING MACHINE

Rufus N. Palmer, Pittsburgh, Pa., assignor to American Pearl Button Co., Washington, Iowa, a corporation of Iowa Application October 17, 1945, Serial No. 622,725

4 Claims. (Cl. 79—16)

My present invention relates to a button blank cutting machine of the vertical spindle type, and particularly to shell holding mechanism and automatic means for operating it and for feeding the shell to the cutting saw, the structure being designed for ready adaptation of a regulation drill press.

One object of the invention is to provide a holding means for the shell so that the operator does not have to use gloves or tongs to hold the shell and can accordingly feed shells to two or three spindles instead of one, as only part of his time is required in placing the shells in the holder.

Another object is to provide button blank cutting means which is designed so that it can be substituted for the spindle in a regulation drill press, with a shell supporting and feeding means being in the form of an attachment to replace the table of the drill press.

Another object is to provide a holder for a brittle element such as a mussel shell wherein separate and adequate supports for the blank to be cut and for the shell surrounding the blank are provided so that the blanks produced are neither chipped around their lower edges nor do they have undesirable fins surrounding their lower edges, the supporting means being effective to support shells in which the thickness varies and the inner and outer surfaces are uneven.

Another object is to provide a support for a shell that so coacts with the concave surface of the shell that the sides of a button blank cut therefrom are substantially perpendicular to said concave surface.

Another object is to provide a button blank supporting plug which is durable and does not require frequent trimming as in the case of the wooden plugs of the prior art and when once adjusted, does not require frequent adjustment as with wooden plugs.

Still another object is to provide a support for a shell which engages the shell with points, preferably three, located far enough from the center of rotation to provide an adequate resisting moment against the cutting torque applied to the shell as a blank is being cut therefrom. This is accomplished by locating the points outside the outer surface of the saw.

Still another object is to provide a shell holder opposing the shell support which may also be rigidly attached to the drill press in position for cooperating with the shell support to hold the shell against turning while the blank is being cut therefrom, and thereafter while the saw and the blank are being removed from the shell.

A further object is to provide means for feeding water to the shell support and to the saw for washing away the cuttings to thereby prevent the saw and the shell support from becoming clogged.

With these and other objects in view, my invention consists in the construction, arrangement and combination of the various parts of my device whereby the objects contemplated are attained, as hereinafter more fully set forth, pointed out in the claims and illustrated in the accompanying drawings, wherein:

Fig. 1 is a side elevation of a drill press with my button cutting mechanism attached thereto;

Fig. 1a is an enlarged sectional view on the line 1a—1a of Fig. 1;

Fig. 2 is an enlarged side elevation showing a shell in position and held between a shell support and a shell holder, the support being shown partially in section, and other portions of this figure being sectioned to show constructional features;

Fig. 3 is a sectional view on the line 3—3 of Fig. 2, showing the shell holder in plan view;

Fig. 4 is a side elevation of a rock shaft for the shell holder and a spring mounted therein;

Fig. 5 is a front elevation of Fig. 4 looking from the left-hand end thereof;

Fig. 6 is an enlarged vertical sectional view on the line 6—6 of Fig. 1;

Fig. 7 is an enlarged vertical sectional view on the line 7—7 of Fig. 1;

Fig. 8 is a sectional view similar to the lower portion of Fig. 6 and the upper portion of Fig. 7, showing a modified construction on a somewhat larger scale, and with a shell in held position;

Fig. 9 is a view similar to Fig. 8, showing the beginning of the blank cutting operation;

Fig. 10 is a similar view showing the completion of the blank cutting operation;

Fig. 11 is an enlarged plan view of the support shown in Fig. 2;

Fig. 12 is an enlarged plan view of the support shown in Fig. 10;

Fig. 13 is a sectional view similar to a portion of Fig. 10, showing the button blank depressed into the shell support, after the saw cuts through as in Fig. 10, the shell being omitted from this figure; and Fig. 14 is a view showing the blank raised again as the support moves downwardly, the shell being omitted from this figure also.

On the accompanying drawings I have used the reference numeral 10 to indicate a base of a drill press. A post 12 extends upwardly therefrom and has the usual drill head H and table supporting bracket S mounted thereon. A sleeve 14 of the head H is provided with bearings 16 and 18 (see Fig. 6) and there is ordinarily a spindle journaled in these bearings. I remove such spindle and replace it with one of my own, indicated at 20. The spindle 20 is tubular, and is secured to the inner races of the bearings 16 and 18 by means of a lock nut 22, a spacer sleeve 24 being interposed between the inner races and the lower one contacting with a shoulder 26 of the spindle.

Secured to the spindle 20 at its upper end is a pulley 28, a key 30 and set screws 32 being illustrated for this purpose. The pulley 28 is belted by a V-belt or the like 34 to the drive pulley 36 of a motor 38 of the drill press.

At the lower end of the spindle 20 I provide a saw chuck sleeve 40 secured in position, as by set screws 42. A tubular saw 44 is, in turn, secured in the chuck sleeve 40 by set screws 46. This construction may be similar to that shown in my copending application, Serial No. 569,750, filed December 26, 1944, issued November 23, 1948, as Patent No. 2,454,522.

A blank expeller or push rod 48 is slidably mounted in the saw 44 and in a bearing sleeve 50 of the chuck sleeve 40. The rod 48 is tubular to permit passage of water to nozzles 52 at the lower end of the expeller rod. Only one is shown in Fig. 6, but there are preferably a number of them. Said lower end is pointed, with a substantially flat spot at the termination of the point, as illustrated.

A tube 54 forms a continuation of the upper end of the rod 48 and extends through the center of the tubular spindle 20 to a point considerably above the upper end thereof. A cap 56 is screwed thereon, the cap being formed as a head at the lower end of a rod 58. The rod 58 extends slidably through a bracket 60 which I secure to the upper end of the supporting post 12 of the drill press. A spring 62 is interposed between an adjusting nut 64 on the rod 58 and the bracket 60, and above the bracket a second adjusting nut 66 is provided. A water connection is made to the interior of the tube 54 by means of a hose 68 connected to a nipple 70 extending laterally from the tube adjacent its upper end. Within a housing 72 of the drill press there is a cross-member 74 through which the tube 54 slidably extends, the cross-member serving as a guide for the tube.

On the base 10 I mount a housing 76 in which gear reduction mechanism is provided, driven by a shaft 78. The shaft 78 has a pulley 80 thereon belted by a belt 82 to a motor 84. The slow-speed shaft of the gear reducing unit is illustrated at 86. This is a cam shaft on which is mounted a cam 88.

A supporting table 90 is provided, this table being mounted on the supporting bracket S. The table 90 has an opening 92 therein, as shown in Fig. 7, through which a sleeve 94 extends. The opening 92 is counterbored, as at 96, to receive a guide sleeve 98 which is retained rigidly in position with relation to the table 90 by the sleeve 94, the two being screwed together.

A supporting spindle 100 is slidable in a bearing 102 of the sleeve 94 and has a tubular extension 104 at its lower end slidable in a sleeve 106, the sleeve being guided in a bearing 108 of the supporting sleeve 98. The sleeve 106 is bifurcated at its lower end, and a cam roller 110 is mounted therein for rotation on a pin 112. The roller 110 is adapted to cooperate with the cam 88 and is retained thereagainst by a spring 114.

There is a limited sliding connection between the supporting spindle 100 and the sleeve 106 in the form of a pin 116 carried by the sleeve 106 and slots 118 in the sleeve 104. This connection is normally extended by a spring 120 interposed between a shoulder 122 of the supporting spindle 100 and the upper end of the sleeve 106. The roller 110 is prevented from turning relative to the cam 88 by a key 124 carried by the supporting sleeve 98 and anchored thereto by a cap screw 126. The key 124 fits into a keyway 128 of the sleeve 106.

At the upper end of the sleeve 94 packing is provided, as shown at 130, and this packing is held in position by a packing gland 132. The packed joint is covered by a cover 134 to prevent undesirable entrance of cuttings and dust to the packing.

A shell supporting plug 136 is mounted in the upper end of the supporting spindle 100 as by a taper fit indicated at 138. A knock-out hole 140 is provided, as usual in drill press spindles, for the purpose of inserting a wedge for removing the plug from position. The plug, as shown in Fig. 2, is hollow and has a notch 142 cut in its side to permit a button blank 145 to drop away from a shell 144 after it is cut therefrom, as indicated by the arrow 146. The interior of the supporting plug 136 is larger than the exterior diameter of the saw 44 to permit the saw to pass completely through the shell without its teeth being damaged on the supporting plug. The plug, it will be noted, has three prongs 148 for engaging the under surface of the shell and supporting it, regardless of its shape.

Cooperating with the supporting plug 136 and its prongs 148 is a shell holder comprising a yoke 150 having a pair of prongs 152 on opposite sides of the saw 44. The yoke 150 is rigidly mounted in one end of a rock shaft 154 which is journaled in bearings 156 carried by a supporting plate 158. The plate 158, in turn, has two bearings 160 which are pivoted on a round head 162 and a round nut 166 of a clamp bolt 164. The clamp bolt extends through a clamp band 168 which is clamped around the supporting post 12 by the clamp bolt and its nut. The clamp bolt thereby performs the double function of a clamp bolt and a means for pivoting the bearings 160. To limit the plate 158 against longitudinal movement relative to the bolt 164, stop collars 167 are provided.

The rock shaft 154 is held against endwise movement by collars 170 and is retained normally at approximately level position by a leaf spring 172 slightly spaced from the under surface of the supporting plate 158, as shown in Figs. 2 and 4. It will be obvious that the shell holder 150 is pivoted on the axis of the bolt 164 and may swing downwardly by gravity. It is limited in such swinging movement, however, by a stop bolt 174 and a stop nut 176. The bolt 174 is slidable through a plate-like bracket 178 secured to the drill press, and the nut 176 is engageable with the top of this plate, as shown in Fig. 1. When a shell engages the shell holder, however, and lifts it as in Fig. 2, the lock nut 176 is spaced from the bracket plate 178. Such lifting is done in opposition to a spring 179 on the rod 174 between the bracket plate 178 and a washer 181 on the supporting plate 158.

In Figs. 8 to 10 and 12 to 14 I show a modified construction wherein the shell support is in the form of a hollow plug 180 having three prongs 182. The plug 180 has a tapered shank 184 to fit into the supporting sleeve 100 and is tubular so that water can be fed thereto from a hose 186 and a nipple 188. A blank engaging plug 190 is slidable in the sleeve 180 and is urged in an upward direction by a spring 192. The maximum upward position of the plug 190 is approximately that shown in Fig. 14.

Practical operation

In the operation of the first form of my invention a shell 144 is placed on the supporting plug 136 while it is in the lowered position of Fig. 7. The shell will seat properly because of the three-prong support at 148. As the cam 88 rotates, it will lift the sleeve 106 against the action of the spring 114, and the spring 120 will lift the supporting spindle 100 at the same speed as the sleeve 106. This will effect engagement of the shell with the two prongs 152 of the holding yoke 150, and, thereafter, the operator may let go of the shell as it will be confined between the prongs 148 and 152 and rigidly held thereby against turning. When the shell reaches the position of Fig. 2, the spring 179 has been compressed, but the spring 120, which is rather heavily preloaded, will retain the pin 116 at the lower ends of the slot 118, the spring 120 overcoming the spring 179 and the spring 62, as will hereinafter appear. The spring 120 serves as a safety compression member in the event that the saw fails to cut, for any reason, rapidly enough to accommodate the automatic upward motion of the supporting plug 136 at its predetermined speed.

After the supporting spindle 100 is raised to the position of Fig. 2, its further rise will result in the rotating saw 44 cutting a blank from the shell, and the expeller rod 48 will snap the blank downwardly, as indicated by the arrow 146, as soon as the saw cuts through. The button blank, shown by dotted lines at 145 in Fig. 2, will then pass out of the notch 142, thus clearing the blank from the cutting means.

The expeller rod 48 is initially in the lowered position of Figs. 1, 1a and 6, so that as the shell is raised the rod will engage and seat the shell on the prongs 148. Further raising of the shell results in its engagement with the prongs 152 of the holder 150 to prevent the shell from rotating. The spring 62 is compressed beyond the position of Fig. 1 by the upward movement of the supporting spindle 100. Accordingly, when the saw cuts through the shell, the button blank 145 is snapped downwardly by the rod 48 under the expanding action of the spring 62 as the spring returns the rod to its initial position relative to the saw, as shown by dotted lines in Fig. 2.

During the cutting operation, the cuttings or sawdust from the saw are washed away by water fed through the hose 68 and the tube 54 to the nozzles 52 of the rod 48. This keeps the teeth of the saw clean and prevents any undesirable clogging which would reduce their cutting efficiency. The water also serves to wash away any cuttings which might otherwise accumulate on the supporting plug 136 without the necessity of supplying water to the plug itself as in the modified form of my invention.

With respect to the operation of the modified form, the initial positions of the parts are the same as in Figs. 1 and 1a, and after a shell is placed on the supporting plug 180 the supporting spindle 100 rises, as to the position of Fig. 8, which first effects engagement of the shell 144 with the expeller rod 48, thus raising it slightly, and then engagement of the shell with the holder yoke 150. The holder yoke has just been engaged in Fig. 8 and the blank holding plug 190 has been depressed from the normal position of Fig. 14 to the full-line position of Fig. 8, the spring 192 being overcome by the spring 62. Further movement upward of the spindle 100 results in the shell being raised to a point of engagement with the saw, as in Fig. 9, after which still further upward movement results in the saw cutting through the shell, as in Fig. 10.

As soon as the cut is complete the spring 62 moves the button blank 145 downwardly to the position shown in Fig. 13, the button blank thereby being held between the lower end of the rod 48 and the supporting plug 180, with a pressure determined by the spring 192. Subsequently, when the supporting spindle 100 moves downwardly, the saw will be retracted from the shell while the shell is still held by the prongs 182 and 152 and the button blank 145 will be raised to the position shown in Fig. 14 so that it is clear of the plug 180 and can drop off out of the way as this plug and the plug 190 recede from the rod 48 after it is stopped in its downward movement by the stop nut 66.

Since the blank engaging plug 190 is movable within the supporting plug 180 it is desirable to assure that cuttings do not get into the socket of the plug 180 and interfere with proper movement of the plug 190 therein. This is accomplished by the introduction of water to the plug 180 through the hose 186. The water from the nozzles 52 and from the plug 180, as well as the cuttings, are caught by a sump 193 of a tray 194 from which the water and cuttings are drained through a hose 196. A chute 198 extends downwardly from the tray and the cut shells may be placed in it for discharge from the tray. The chute 198 extends upwardly into the tray, as shown at 199 in Fig. 1, to prevent water from entering the chute.

My disclosed button cutting mechanism provides for holding of the shell while the button blank is being cut therefrom so that it is not necessary for the operator to hold the shell by hand. After the blank has been cut from the shell it is expelled from position by the expeller rod 48, without binding, in the first form of my invention. In the second form, the blank is also held (between the plug 190 and the rod 48 which are so related to each other that the blank is removed from the saw as in Fig. 13, as soon as it is cut from the shell). Subsequently, the blank is elevated to a position where it can drop out of the way as it is removed from contact with the expeller rod. In both forms of the invention the shell is held against tilting, and thereby binding the saw when the saw is being retracted from the shell.

Since the machine is designed to hold the shell, it is unnecessary for the operator to do so, and he can accordingly operate two or three machines, thus increasing production two or three-fold as compared to a previous single spindle machine wherein the operator must hold the shell while the cut is being made.

While I have illustrated but a single spindle machine, a multiple spindle drill press may be provided with any desired number of the cams 88 on the cam shaft 86 for successively raising a corresponding number of supporting spindles 100, or a number of individual drill presses may be arranged side by side for operation by a single operator.

The shell and blank holding arrangement is such that breakage of the shell and damage to the blanks is minimized, there being a relatively heavy holding spring 179 arranged for effecting a good grip of the holding prongs and points on the shell and the blank respectively. The tension of the spring 179 determines the pressure of the prongs 152 on the shell 144. This tension is preferably great enough to normally hold the shell from rotating as the saw enters the shell. As a safety factor, however, the tension of the spring 179 should be small enough to permit the shell to be rotated by the saw if the saw accidentally catches in the shell rather than holding the shell so rigidly against rotation that the shell or the saw is broken. The shell holder 150 being pivoted in the bearings 156 by its mounting on the rock shaft 154, will readily tilt sidewise to accommodate a shell having portions of different thicknesses on the prongs 148 or 182, as the case may be, as shown in Fig. 8, with substantially equal pressure on the prongs 152 under the action of the spring 179. Thus the pressure on all the prongs 148 or 182 is likewise substantially equal. When the shell recedes from the holder, however, the rock shaft 154 will be rocked back to approximately the position shown in Fig. 5 so that the prongs 152 will be in a substantially level position for engagement by a subsequent shell. This is accomplished by the leaf spring 172 which normally has but small play with respect to the bracket plate 158, as indicated by the spacing at 159 in Figs. 2, 4 and 5.

The spring arrangement at 192 in Fig. 8 prevents breaking of the shell before the blank is cut free therefrom and eliminates fins of uncut shell around the periphery of the blank.

The small area of contact between the holding prongs and the shell, and the loose fit of the blank supporting plug 190 in the hollow plug 180, allow the plug 190 to adjust itself to the lower surface of the blank so that the firm seating of the shell on the prongs of the plug 180 is not disturbed. There is no tendency for the shell to drop over the plug 180 because the plug is larger than the diameter of the saw. Neither does the button blank cling inside the plug 180 because the free position of the plug 190 is slightly above the prongs of the plug 180, as shown in Fig. 14. With the form of invention shown in Fig. 2, the hollow interior of the plug 136 is sufficiently large to permit free passage of the button blank therethrough and movement of the saw into the plug without damaging the teeth thereof during final cutting through the shell.

While I have described my cutting machine for button blanks cut from shells, it is adaptable for cutting blanks from other materials such as sheet metal or sheet plastic and the like, and my claims are not to be construed as limiting the use of the machine to only the described use.

While I have illustrated and described my blank cutting mechanism as applied to a drill press, it obviously can be fabricated as a complete machine.

Certain changes may be made in the construction and arrangement of the parts of my cutting machine without departing from the real spirit and purpose of my invention, and it is my intention to cover by my claims any modified forms of structure or use of mechanical equivalents which may be reasonably included within their scope.

I claim as my invention:

1. In a button blank cutting machine of the character disclosed, a rotating spindle, a tubular saw chucked therein, means for holding a shell to be cut comprising a hollow supporting plug, said saw and supporting plug being movable relatively toward each other, means for effecting such movement, said supporting plug having three prongs to engage one face of the shell outside of the outline of the blank to be cut therefrom, a shell holder having a pair of prongs to engage the opposite face of said shell outside the outline of the blank, said holder being pivotally mounted to permit substantially equal pressure of said last prongs against the shell and the shell against the first prongs when said saw and supporting plug are so moved by said second means, resilient means opposing movement of said holder by said supporting plug upon its engagement with the shell, said prongs of said holder being positioned in relation to said saw to engage the shell before it engages the saw, a push rod within said saw, and resilient means biasing said push rod outwardly to a limit of movement with the point of the rod extending beyond the teeth of the saw whereby said point engages the button blank to be cut before the shell contacts the saw, the resilient means of said push rod expelling the blank through said supporting plug, said supporting plug as it moves relatively away from said saw permitting the holder to disengage the shell from the saw and the shell to disengage from the holder.

2. In a button blank cutting machine, a rotating spindle, a tubular saw chucked therein, means for holding a shell to be cut comprising a supporting plug, said saw and supporting plug being movable relatively toward each other, said supporting plug having three equally spaced prongs to engage one face of the shell outside of the outline of the blank to be cut therefrom, and a shell holder having two diametrically opposed prongs to engage the opposite face of said shell outside the outline of the blank, said holder being pivotally mounted to permit substantially equal pressure of said shell holder prongs against the shell and the shell against the supporting plug prongs when said saw and supporting plug are so moved.

3. In a blank cutting machine, a rotating spindle, a tubular saw rotated thereby, means for holding an element from which a blank is to be cut comprising a supporting plug relatively movable toward said spindle and saw, said supporting plug engaging one face of the element, a blank engaging plug movable in said supporting plug and constrained to move outwardly relative thereto by resilient means, an element holder to engage the opposite face of the element, resilient means opposing movement of said holder by the engagement of an element on said supporting plug therewith, said holder being positioned in relation to said saw to engage the element before it engages the saw, a push rod within said saw, resilient means biasing said push rod outwardly to a limit of movement with the point of the rod extending beyond the teeth of the saw whereby said point engages the button blank to be cut before the shell contacts the saw, the resilient means of said push rod being stronger than the resilient means of said blank engaging plug to permit the blank to be moved into the supporting plug after the saw cuts through the element, the blank being thereafter expelled from the supporting plug by said blank engaging plug as the supporting plug relatively recedes in relation to the spindle and saw and disengages the element from the holder and the saw.

4. In a blank cutting machine, a rotating spindle, a tubular saw chucked therein, means for holding an element and a blank to be cut therefrom during the cutting operation comprising a supporting plug movable toward said saw, resilient means to move said supporting plug for engaging it with one face of the element, a blank engaging plug movable in said supporting plug, means constraining said blank engaging plug to move outwardly relative to said supporting plug, an element holder to engage the opposite face of the element, resilient means opposing movement of said holder by said supporting plug upon the holder being engaged by an element on the supporting plug, said holder being positioned in relation to said saw to engage the element before it engages the saw, a push rod within said saw, resilient means biasing said push rod outwardly to a limit of movement with a point of the rod extending beyond the teeth of the saw, the resilient means of said push rod being stronger than the resilient means of said blank engaging plug to permit the blank to be moved into the supporting plug after the saw cuts through the element, the blank being thereafter expelled from the supporting plug by said blank engaging plug as the supporting plug recedes from the saw and disengages the element from the holder and the saw.

RUFUS N. PALMER.

REFERENCES CITED

The following references are of record in the file of this patent:

UNITED STATES PATENTS

| Number | Name | Date |
|---|---|---|
| 269,567 | Dolan | Dec. 26, 1882 |
| 492,846 | Snyder | Mar. 7, 1893 |
| 631,677 | Shantz | Aug. 22, 1899 |
| 638,881 | Pendry | Dec. 12, 1899 |
| 736,167 | Stimpson | Aug. 11, 1903 |
| 828,225 | Lorenz | Aug. 7, 1906 |
| 844,064 | Wallace | Feb. 12, 1907 |
| 850,033 | Miller | Apr. 9, 1907 |
| 897,187 | Barry | Aug. 25, 1908 |
| 904,103 | Wallace | Nov. 17, 1908 |
| 919,914 | Miller | Apr. 27, 1909 |
| 947,995 | Miller | Feb. 1, 1910 |
| 1,129,166 | Chalmers | Feb. 23, 1915 |
| 1,230,688 | Dusha et al. | June 19, 1917 |
| 1,761,731 | Knott | June 3, 1930 |
| 1,843,326 | Knott | Feb. 2, 1932 |
| 2,163,338 | Hopkins | June 20, 1939 |